(12) United States Patent
Rothschild

(10) Patent No.: US 12,462,049 B1
(45) Date of Patent: Nov. 4, 2025

(54) METHOD AND AN ELECTRONIC DEVICE FOR DECODING INFORMATION IN A MULTI-DIMENSIONAL ENCRYPTED CODE

(71) Applicant: Leigh M. Rothschild, Miami, FL (US)

(72) Inventor: Leigh M. Rothschild, Miami, FL (US)

( * ) Notice: Subject to any disclaimer, the term of this patent is extended or adjusted under 35 U.S.C. 154(b) by 0 days.

(21) Appl. No.: 18/796,250

(22) Filed: Aug. 6, 2024

(51) Int. Cl.
*G06F 21/60* (2013.01)
*G06F 21/36* (2013.01)

(52) U.S. Cl.
CPC ............ *G06F 21/602* (2013.01); *G06F 21/36* (2013.01)

(58) Field of Classification Search
CPC ............................... G06F 21/602; G06F 21/36
See application file for complete search history.

(56) References Cited

U.S. PATENT DOCUMENTS

| | | | | |
|---|---|---|---|---|
| 8,321,930 | B1* | 11/2012 | Taylor | H04L 9/3226 726/19 |
| 9,111,186 | B2 | 8/2015 | Blasinski et al. | |
| 10,762,317 | B2 | 9/2020 | Fan et al. | |
| 2006/0097513 | A1 | 5/2006 | Caldwell | |
| 2011/0072263 | A1* | 3/2011 | Bishop | G06F 21/36 713/168 |
| 2016/0106625 | A1* | 4/2016 | Dunleavy | B65D 25/04 206/534 |
| 2016/0239672 | A1* | 8/2016 | Khan | G06Q 20/204 |
| 2017/0243097 | A1* | 8/2017 | Loy | G06K 7/1443 |
| 2023/0109798 | A1 | 4/2023 | Jiang | |
| 2024/0135627 | A1* | 4/2024 | Song | G06T 15/02 |
| 2024/0257388 | A1* | 8/2024 | Bolognesi | G06T 7/337 |

* cited by examiner

*Primary Examiner* — Meng Li
(74) *Attorney, Agent, or Firm* — Dobbin IP Law, P.C.; Geoffrey E. Dobbin

(57) ABSTRACT

A method for decoding information in a multi-dimensional encrypted code is disclosed. The method involves scanning the code with an image sensor, identifying color patterns within geometrical shapes, and translating these patterns into user-readable information or URLs. The system enhances security by bypassing intermediate servers and using embedded features like digital watermarks to prevent unauthorized access. Error correction techniques ensure accurate decoding even if the code is damaged. Additionally, a neural network improves pattern recognition through machine learning. The user interface offers customization options and accessibility features, while spectral analysis distinguishes subtle color variations to encode more data. An example demonstrates decoding a product label's encrypted code into alphanumeric characters, ensuring accurate and reliable information display. This method ensures secure, flexible, and user-friendly decoding of complex encrypted information.

18 Claims, 7 Drawing Sheets
(4 of 7 Drawing Sheet(s) Filed in Color)

METHOD AND AN ELECTRONIC DEVICE FOR DECODING INFORMATION IN A MULTI-DIMENSIONAL ENCRYPTED CODE

TECHNICAL FIELD

The present disclosure in general relates to data encoding and decoding technologies, specifically focusing on methods and systems for decoding multi-dimensional encrypted codes. More specifically, the present disclosure relates to decoding color-based encrypted codes and include complex patterns to represent information such as alphanumeric characters, symbols, and URLs.

BACKGROUND

In the realm of data encoding and decoding technologies, traditional methods such as barcodes and QR codes (a two-dimensional bar code) have long been used to store and transmit information. Traditional barcodes and QR codes are limited in the amount of data they can store. This restriction often necessitates the use of external databases or additional steps to access comprehensive information, leading to inefficiencies and potential security vulnerabilities. Moreover, these codes are susceptible to unauthorized copying and tampering, posing serious security risks in applications requiring secure data transmission and storage. Accurate decoding of data from these codes can be problematic, particularly in real-world conditions where codes might be partially damaged, obscured, or subject to variations in size and shape. Traditional decoding mechanisms lack the flexibility to adapt to such variations, resulting in errors and data loss. This challenge is compounded when dealing with complex patterns and color-based encoding, which require sophisticated recognition capabilities. Many existing systems rely on intermediate servers or URL shorteners to redirect users to the desired information or web addresses. This not only introduces latency but also exposes users to potential privacy breaches, as their interactions can be tracked or intercepted. The critical challenge is to ensure direct access to information confidentially. Users increasingly demand the ability to create customized and personalized encoded data for various personal and business applications. However, traditional encoding systems offer limited customization options and often fail to accommodate the needs of visually impaired users, who require accessible formats such as tactile elements. Static information encoding is insufficient in scenarios where the data needs to change over time, such as in dynamic marketing campaigns or time-sensitive information dissemination. Traditional codes do not support time-based changes, limiting their applicability in such dynamic contexts.

Various conventional methods have been employed to address the technical challenges inherent in data encoding and decoding. Traditional barcodes and QR codes have served as ubiquitous solutions, but they suffer from limitations such as limited data capacity and vulnerability to tampering. Encryption and digital watermarks offer enhanced security but introduce complexity and performance overhead. Intermediary servers and URL shorteners are commonly used for managing data redirection but raise concerns regarding privacy and latency. Error correction techniques, like Reed-Solomon codes, can recover from minor damage but are limited in their effectiveness and increase data overhead. User interface tools for customization lack advanced features and accessibility options, failing to cater to diverse user needs. Machine learning for pattern recognition shows promise in improving accuracy but requires extensive training data and computational resources. Dynamic codes capable of time-based changes present implementation complexities and compatibility issues across different platforms.

As a result, there is a need for a method and an electronic device for decoding information in a multi-dimensional encrypted code.

U.S. Pat. No. 9,111,186B2 focuses on decoding a two-dimensional color barcode with layers of encoded data. It emphasizes color interference cancellation to estimate cyan, magenta, and yellow layers from red, green, and blue channels. In contrast, to the teachings of U.S. Pat. No. 9,111,186B2, the present disclosure focuses on decoding information from a multi-dimensional encrypted code, particularly colored codes. Present disclosure emphasizes translating color patterns into readable information or URLs and includes various additional features and techniques for enhanced decoding. U.S. Pat. No. 9,111,186B2 captures an image of the color barcode with a three-channel image capture device. It performs color interference cancellation to estimate the colorant layers. It extracts layers of encoded data using the estimated colorant layers. U.S. Pat. No. 9,111,186B2 scans the encrypted code with an image sensor. It identifies color patterns indicative of alphanumeric characters, symbols, and capitalization. Whereas in the present disclosure color interference cancellation uses synchronization patterns within the barcode. It estimates parameters derived from regions with encoded data with iterative estimation between parameters and data values. In contrast, U.S. Pat. No. 9,111,186B2 presents disclosure bypasses intermediate servers and URL shorteners for direct access. Present disclosure discloses various features such as embedded security features like digital watermarks or encrypted color sequences, geometric shapes with varying sizes and colors to define patterns, mapping color sequences to characters for forming URLs. U.S. Pat. No. 9,111,186B2 is primarily concerned with decoding a layered two-dimensional color barcode through a specific process of color interference cancellation and data extraction. Whereas the present disclosure describes a broader and more advanced method for decoding multi-dimensional encrypted codes, with numerous features and enhancements to improve security, accuracy, and usability.

U.S. Pat. No. 10,762,317B2 describes a Barcode System with Re-publishable Content or Tasks, which is focused on managing tasks, user skill levels, and content distribution through 2D barcodes. It involves a data server, mobile communication devices, user ID recognition, and task management modules. Users scan barcodes to access quizzes or games, complete tasks and upload results for skill level evaluation. The system enables republishing tasks to other users' eBooks and includes settings for skill subscription and validity dates. On the other hand, present disclosure discloses a method for decoding information in a multi-dimensional encrypted code. This method involves scanning the code, identifying color patterns within geometrical shapes, and translating them into user-readable information or URLs. The system emphasizes security by bypassing intermediate servers, using digital watermarks, error correction techniques, and machine learning for pattern recognition. The user interface offers customization options and accessibility features, while spectral analysis enhances data encoding capacity. U.S. Pat. No. 10,762,317B2 focuses on task management and content distribution through 2D barcodes, while present disclosure details a method for decoding encrypted information using color patterns and geometrical shapes, with a strong emphasis on security, error correction, and machine learning.

US2023109798A1 focuses on techniques for quickly generating a deformed QR code that can be scanned at different angles by a QR code scanner. It involves receiving an initial QR code, determining the angle at which it's being scanned, and then generating a modified QR code that can be scanned at that angle. The emphasis is on optimizing the scanning process for different orientations. In contrast to US2023109798A1, the present disclosure describes a method for decoding information from a multi-dimensional encrypted code. It involves scanning the code, identifying color patterns within shapes, and translating them into user-readable information or URLs. This method prioritizes security by bypassing intermediate servers, utilizing digital watermarks, and employing error correction techniques. Additionally, it utilizes machine learning through a neural network for pattern recognition and offers customization options for user interface and accessibility. Spectral analysis is used to encode more data by distinguishing subtle color variations. The average human eye can distinguish between one million different colors while a current RGB monitor can generate almost 17 million different colors. "Subtle color variations" as used in this Application will at least correspond to the level of variation distinguishable by the human eye and may include greater variety. The focus here is on enhancing security, accuracy, and user-friendliness in decoding complex encrypted information. As a result, there is a need for a method and an apparatus for decoding information in a multi-dimensional encrypted code.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there may be provided a method for decoding information in a multi-dimensional encrypted code. The method may be implemented by an electronic device. The method comprises scanning a multi-dimensional encrypted code using an image sensor. In an embodiment, the multi-dimensional encrypted code is colored. The method comprises identifying one or more color patterns within the multi-dimensional encrypted code. In an embodiment, each of the one or more color patterns are indicative of one or more alphanumeric characters, one or more symbols, and capitalization, collectively "encoded characters." For purposes of this Specification and the appended claims, the term "encoded characters" will include and not be limited to alphanumeric characters (including capitalizations and lower-case characters), symbols, glyphs, graphemes, emojis, pictographs, compound characters, or any other type of unit used in the diverse written languages known in the world. As such, this Specification should not be limited to application in languages utilizing the Roman alphabet, but may include other written languages such as Japanese, Mandarin and other Chinese languages, Korean, Arabic, Cyrillic, Greek, and Hebrew. The method comprises translating the identified one or more color patterns into at least one of a user readable information or a Uniform Resource Locator (URL). The method comprises providing at least one of the user readable information to a user. The method comprises directing the user to a web address defined by the Uniform Resource Locator (URL).

According to embodiments illustrated herein, there may be provided an electronic device that is configured to scan a multi-dimensional encrypted code by using an image sensor. In an embodiment, the multi-dimensional encrypted code is colored. One or more color patterns within the multi-dimensional encrypted code are identified by an electronic device. In an embodiment, one or more color patterns is indicative of one or more alphanumeric characters, one or more symbols, and capitalization. The identified one or more color patterns into at least one of a user-readable information or a Uniform Resource Locator (URL) translate, by an electronic device. The electronic device provides at least one of the user-readable information to a user and the electronic device directs the user to a web address defined by the Uniform Resource Locator (URL).

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION

Figure 1:
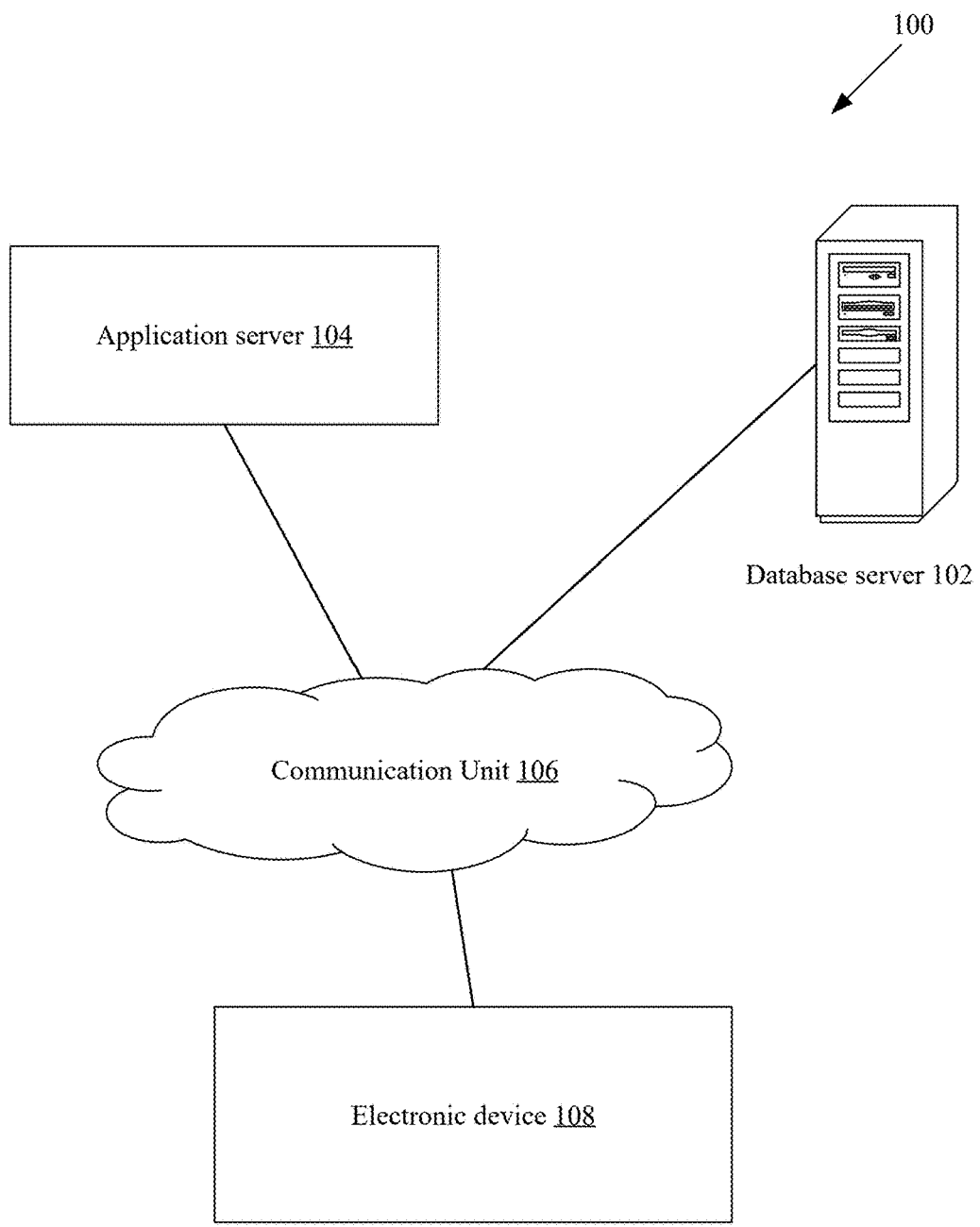
FIG. 1 is a block diagram that illustrates a system environment in which various embodiments of the method may be implemented.

The patent or application file contains at least one drawing executed in color. Copies of this patent or patent application publication with color drawing(s) will be provided by the Office upon request and payment of the necessary fee.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

The primary objectives of the present disclosure are to improve upon traditional encoding methods by increasing the data capacity of multi-dimensional encrypted codes while simultaneously enhancing security features. This is achieved through the utilization of color patterns and embedded security features like digital watermarks and encrypted sequences. Yet another objective of the present disclosure is to improve the accuracy and flexibility of decoding processes, by incorporating advanced error correction techniques and machine learning algorithms. This includes the ability to accurately decode codes even when they are partially damaged or obscured, as well as adapting to new color patterns and shapes dynamically. One of the key objectives is to provide direct access to user-readable information and web addresses without relying on intermediary servers or URL softeners. This not only reduces latency but also enhances user privacy and confidentiality by bypassing potential points of interception. Yet another objective of the present disclosure is to provide users with customization options for generating personalized multi-dimensional encrypted codes. Additionally, it includes features such as tactile elements to ensure accessibility for visually impaired users, thus catering to a wider range of user needs. Another objective of the present disclosure is to support dynamic data encoding, allowing the encoded information to change over time. This feature enables the representation of different data at different times, making the present disclosure suitable for applications requiring real-time dynamic updates or time-sensitive information dissemination.

These multi-dimensional encrypted codes are color-based and include complex patterns to represent information such as alphanumeric characters, symbols, and URLs. The present disclosure also touches on aspects of image processing, pattern recognition, and secure data transmission. Furthermore, it incorporates advanced techniques like machine learning for dynamic pattern recognition, error correction for robust decoding, and accessibility features for visually impaired users.

The present disclosure presents a method for decoding multi-dimensional encrypted codes, specifically focusing on enhancing the efficiency, security, and flexibility of data encoding and decoding processes. Traditional methods, such as barcodes and QR codes, are limited in their data capacity, security features, and adaptability to dynamic data representation. To address these shortcomings, the present disclosure introduces a system that utilizes color patterns within multi-dimensional encrypted codes, enabling more robust encryption, error correction, and direct access to information without the need for intermediary servers. Key features of the present disclosure include advanced error correction techniques, machine learning for pattern recognition, and support for dynamic data encoding, allowing for real-time updates and improved accessibility for visually impaired users. Additionally, the present disclosure provides user customization options, ensuring that encoded data can be tailored to specific needs. Overall, the present disclosure represents a significant advancement in data encoding and decoding technology, offering a comprehensive solution to the technical challenges present in current methods and paving the way for more secure, efficient, and user-friendly information exchange systems.

FIG. 1 is a block diagram that illustrates a system environment 100 in which various embodiments of the method may be implemented. The system environment 100 typically includes a database server 102, an application server 104, a communication network 106, and an electronic device 108 are typically communicatively coupled with each other via the communication network 106.

The database server 102 is essential for storing the mappings of color patterns to their corresponding alphanumeric characters, symbols, URLs, and other user-readable information. This storage facilitates quick referencing and accurate translation by the electronic device 108 during the scanning process. Furthermore, for features such as personalized multi-dimensional encrypted codes, the database server 102 would manage user-specific data and customization settings, enabling users to generate and retrieve their unique codes efficiently. Additionally, if the method incorporates a neural network for dynamically learning and adapting to new color patterns and geometrical shapes, the training data and models would be housed on the database server 102, ensuring continuous improvement in decoding accuracy and flexibility. The database server 102 would also store information related to error correction techniques and embedded security features like digital watermarks or encrypted color sequences, crucial for handling partially damaged codes and preventing unauthorized tampering.

In an embodiment, the application server 104 may refer to a computing device or a software framework hosting an application or a software service. In an embodiment, the application server 104 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 104 may be realized through various types of application servers such as, but are not limited to, a Java application server, a .NET framework application server, a Base4 application server, a PHP framework application server, or any other application server framework.

The application server 104 is crucial for the seamless execution of this process. An application server would handle the complex logic required for scanning, identifying, translating, and providing the decoded information. When an electronic device 108 scans the multi-dimensional encrypted code, the application server 104 processes the image data to identify the embedded color patterns. The application server 104 then translates these patterns into user-readable information or URLs by referencing the mappings stored on a database server. The application server 104 also ensures that upon scanning, intermediate servers and URL shorteners are bypassed to maintain confidentiality and direct access to the decoded information or web address. Additionally, application server 104 manages the dynamic aspects of the system, such as employing neural networks for learning new patterns and implementing error correction techniques to ensure accuracy even when codes are damaged. For personalized and customizable multi-dimensional encrypted codes, the application server 104 facilitates user interactions through a user interface, enabling the creation and management of unique codes. The application server 104 may also handle time-based color changes for encoding dynamic information, providing enhanced data representation.

The communication network 106 facilitates exchange of information for implementing the method for decoding multi-dimensional encrypted codes. The communication network 106 is responsible for transmitting the scanned data from the image sensor of the electronic device to the application server 104, where the decoding techniques are executed. Once the application server 104 processes the image data, identifies the color patterns, and translates them into user-readable information or URLs, the communication network 106 ensures that this decoded information is relayed back to the user's device 108. Additionally, the communication network 106 manages the secure transmission of data to maintain confidentiality, especially when intermediate servers and URL shorteners are bypassed. Communication network 106 also supports dynamic interactions with external systems, such as directing the user to web addresses defined by the decoded URLs. In scenarios involving neural networks and machine learning, the communication network 106 facilitates the transfer of training data and model updates between the application server 104 and the database server 102, ensuring continuous learning and adaptation to new color patterns.

Furthermore, for personalized multi-dimensional encrypted codes, the communication network 106 enables the customization interface to interact seamlessly with back-end systems. The communication network 106 underpins the overall functionality and reliability of the multi-dimensional encrypted code decoding system, by handling these critical data exchanges efficiently and securely.

In an embodiment, the communication network 106 may correspond to a communication medium through which the application server 104, and the user-computing device 108 may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared IR), IEEE 802.11, 802.16, 2G, 3G, 4G, 5G, 6G cellular communication protocols, satellite communication, and/or Bluetooth (BT) communication protocols. The communication network 104 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

The electronic device 108, in the described method for decoding multi-dimensional encrypted codes is the primary interface through which the user interacts with the system. The electronic device 108 is equipped with an image sensor (usually a charged coupled device, CCD), which scans the multi-dimensional encrypted code, capturing its intricate details, including the various color patterns that encode the information. The electronic device 108 then processes this visual data to identify specific color patterns, each corresponding to at least one encoded character. This processing involves sophisticated image recognition and analysis capabilities embedded within the device. After identifying the color patterns, the electronic device 108 translates them into user-readable information or URLs. This translation process may utilize predefined mappings stored on a database server 102, ensuring accuracy and speed. The electronic device 108 can display the user-readable information directly to the user or redirect the user to a web address specified by the URL, once the information is decoded. The electronic device 108 also plays a crucial role in bypassing intermediate servers and URL shorteners, thereby enhancing the security and confidentiality of the decoded data. Additionally, the electronic device 108 may incorporate advanced features such as error correction to handle partially damaged codes, and it could potentially use machine learning models to adapt to new patterns and improve decoding accuracy.

In an embodiment, the electronic device 108 may refer to a computing device used by a user. The electronic device 108 may comprise of one or more processors and one or more memories. The one or more memories may include computer readable code that may be executable by the one or more processors to perform predetermined operations. In an embodiment, the electronic device 108 may present a web user interface to transmit the scanned image to the application server 104. Example web user interfaces presented on the electronic device 108 may include a display of the decoded information. Examples of the electronic device 108 may include, but are not limited to, a personal computer, a laptop, a personal digital assistant (PDA), a mobile device such as a cellular phone, a tablet, or any other computing device.

Figure 2:
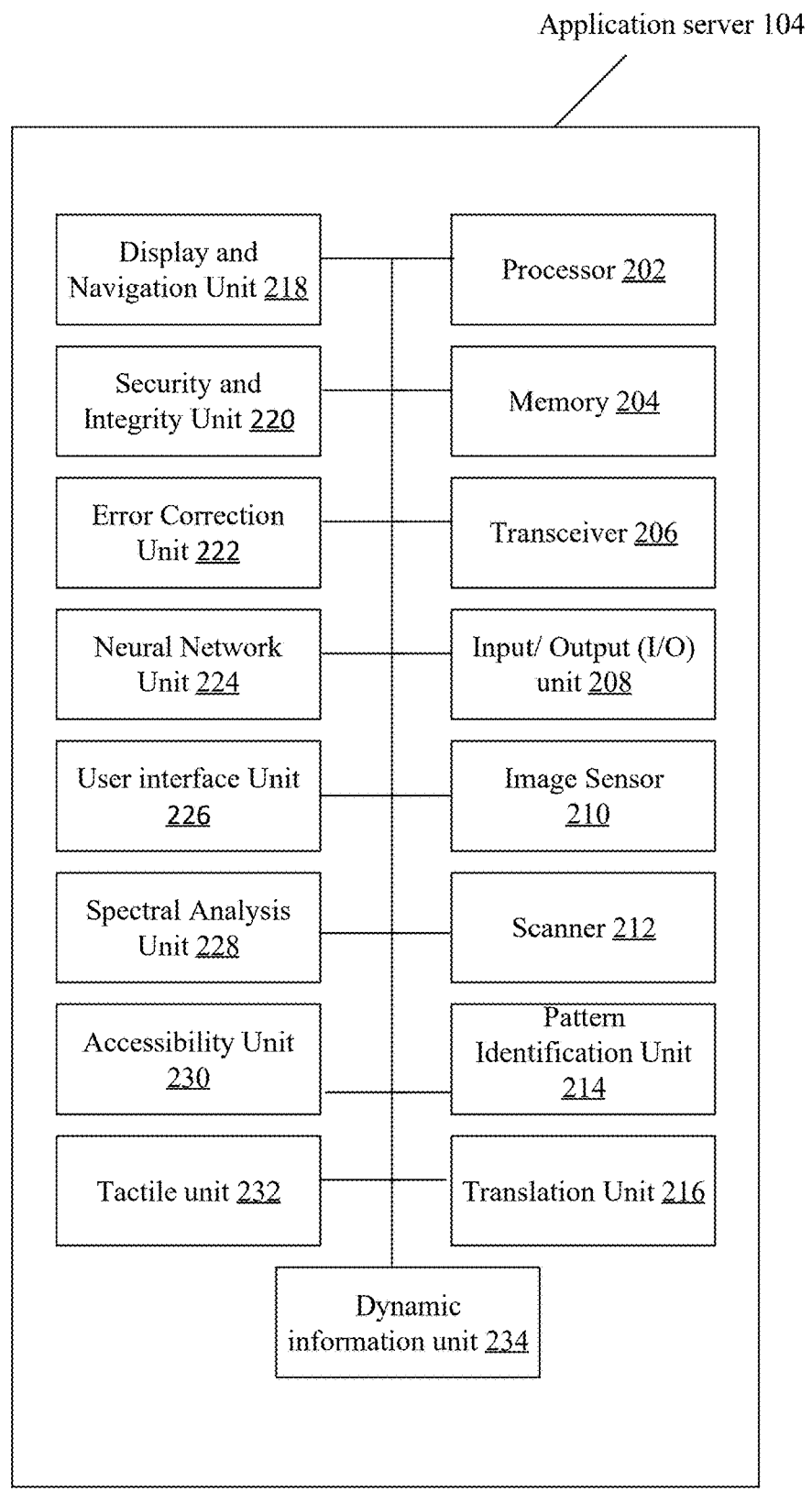
FIG. 2 is a block diagram that illustrates an application server 104 configured to decode information in a multi-dimensional encrypted code, in accordance with an embodiment of present disclosure.

FIG. 2 is a block diagram that illustrates an application server 104 configured to decode information in a multi-dimensional encrypted code, in accordance with an embodiment of present disclosure. FIG. 2 is explained in conjunction with elements from FIG. 1. Here, the application server 104 preferably includes a processor 202, a memory 204, a transceiver 206, an input/output unit 208, image sensor 210, Scanner 212, Pattern Identification unit 214, Translation unit 216, Display and Navigation unit 218, Security and Integrity unit 220, Error Correction unit 222, Neural Network unit 224, User interface unit 226, Spectral Analysis unit 228, Accessibility unit 230 and Tactile unit 232.

The Processor 202 comprises suitable logic, circuitry, interfaces, and/or code that may be configured to execute a set of instructions stored in the memory 204, and may be implemented based on several Processor 202 technologies known in the art. The processor 202 works in coordination with the transceiver 206, an input/output unit 208, image sensor 210, Scanner 212, Pattern Identification unit 214, Translation unit 216, Display and Navigation unit 218, Security and Integrity unit 220, Error Correction unit 222, Neural Network unit 224, User interface unit 226, Spectral Analysis unit 228, Accessibility unit 230, Tactile unit 232 and Dynamic information unit 234. Examples of the processor 202 include, but are not limited to, an X86-based processor, a Reduced Instruction Set Computing (RISC) processor, an Application-Specific Integrated Circuit (ASIC) processor, and a Complex Instruction Set Computing (CISC) processor, for example.

The memory 204 comprises suitable logic, circuitry, interfaces, and/or code that may be configured to store the set of instructions, which are executed by the processor 202. Preferably, the memory 204 is configured to store one or more programs, routines, or scripts that are executed in coordination with the processor 202. Additionally, the memory 204 may be implemented based on a Random Access Memory (RAM), a Read-Only Memory (ROM), a Hard Disk Drive (HDD), a storage server, and/or a Secure Digital (SD) card.

The transceiver 206 comprises suitable logic, circuitry, interfaces, and/or code that may be configured to obtain one or more attributes associated with an application server. The transceiver 206 enables wireless communication capabilities, allowing the device to connect to Wi-Fi networks, Bluetooth-enabled devices, or cellular networks. This connectivity facilitates data exchange, firmware updates, and remote configuration. The transceiver 206 serves as the interface for transmitting and receiving data packets over wireless networks. This includes exchanging information with other devices, accessing online resources, and transferring data to and from remote servers. The transceiver 206 supports various network protocols and standards, ensuring compatibility with different communication technologies. This versatility enables seamless integration with existing network infrastructures. The transceiver 206 may offer adjustable transmission power and bandwidth settings, allowing the device to optimize communication range and data transfer speeds based on environmental conditions and network requirements. The transceiver 206 incorporates security features such as encryption, authentication, and data integrity checks to ensure secure communication over wireless networks. This protects sensitive information and prevents unauthorized access. The transceiver 206 could be implemented as a hardware module within the electronic device 106, comprising radio frequency (RF) components, antennas, and signal processing circuitry. Alternatively, it could be integrated into the device's system-on-chip (SoC) or as a separate module connected via interfaces such as USB or PCIe.

The Input/Output unit 208 includes components such as buttons, touchscreens, or touchpads that serve as user interfaces for interacting with the device. These interfaces enable users to input commands, initiate actions, and navigate menus. A display screen, such as an LCD or OLED panel, is part of the Input/Output unit 208 and provides visual feedback to the user. The Input/Output unit 208 displays decoded information, user notifications, augmented reality (AR) overlays, and other graphical elements. The Input/Output unit 208 could be implemented as a combination of hardware components, including buttons, touchscreens, speakers, microphones, and ports, integrated into the device's physical design. Additionally, software components would interface with these hardware elements to manage input/output unit 208 operations and user interaction. The input/output unit 208 comprises of various input and output devices that are configured to communicate with the processor 202. Examples of the input devices include but are not limited to, a keyboard, a mouse, a joystick, a touch screen, a microphone, a camera, and/or a docking station. Examples of the output devices include, but are not limited to, a display screen and/or a speaker.

The image sensor 210 is a critical component of the electronic device 108, serving as the initial point of interaction with the encrypted code. The image sensor's primary function is to capture high-resolution images of the multi-dimensional encrypted code, which includes various color patterns that encode information. The image sensor 210 is capable of accurately distinguishing between subtle color variations and geometrical shapes. This precision is essential for the subsequent steps in the decoding process, where the electronic device 108 identifies and translates the color patterns into user-readable information or URLs. The effectiveness of the image sensor 210 impacts the overall accuracy and reliability of the decoding method. A high-quality image sensor 210 ensures that even minute differences in color and shape are detected, which is crucial for decoding complex patterns and for implementing advanced features such as spectral analysis. Spectral analysis allows the electronic device 108 to distinguish between subtle color variations, thus enabling a greater range of information to be encoded within the same physical space.

Furthermore, the image sensor's ability to capture detailed images facilitates the identification of embedded security features like digital watermarks or encrypted color sequences, which are designed to prevent unauthorized copying or tampering. The sensor's role is not limited to static codes; it can also handle dynamic codes that employ time-based color changes to encode varying information over time.

The scanner 212 is a fundamental component that initiates the scanning process. Embedded within the electronic device 108, the scanner 212 utilizes an advanced image sensor 210 to capture detailed images of the encrypted code. The multi-dimensional encrypted code, which is colored and potentially intricate, requires the scanner to distinguish between various color patterns and geometrical shapes accurately. These patterns encode information such as alphanumeric characters, symbols, and capitalization, which the scanner must identify with precision. The scanner's capability to detect subtle color variations and spatial relationships between shapes is crucial for the accurate identification and decoding of the encrypted information. Once scanner 212 captures the image of the code, it processes this data to identify specific color patterns. This involves analyzing the size, shape, color, and distance between the geometrical shapes within the code. The scanner's role extends beyond mere image capture; it must also handle the decoding of dynamic codes that use time-based color changes to represent different data at different times. Additionally, scanner 212 plays a vital role in security, helping to identify embedded features like digital watermarks or encrypted color sequences that prevent unauthorized copying or tampering. The scanner's efficiency directly affects the overall functionality of the electronic device in delivering user-readable information or URLs derived from the scanned codes. The scanner 212 ensures that the subsequent translation process by the electronic device is both reliable and swift, by providing high-resolution, accurate images. In essence, the scanner is the gateway through which the multi-dimensional encrypted code is brought into the digital realm for processing, decoding, and presentation to the user.

The Pattern Identification Unit 214 may include suitable logic, circuitry, interfaces, and/or code that may be configured for analyzing scanned images and identifying the embedded color patterns. After the electronic device's image sensor 210 captures a high-resolution image of the multi-dimensional encrypted code, the Pattern Identification Unit 214 processes this image to detect specific patterns within the code. These patterns are composed of various geometrical shapes and colors, arranged in ways that encode characters, and other information. The Pattern Identification Unit 214 must accurately discern the size, shape, color, and spatial relationships of these geometrical shapes to decode the information they represent. This involves sophisticated image processing techniques to differentiate between subtle color variations and intricate shape arrangements. The unit's ability to identify these patterns correctly is essential for translating them into user-readable information or URLs.

Furthermore, Pattern Identification Unit 214 enhances the system's security and reliability by recognizing embedded security features like digital watermarks or encrypted color sequences, which are designed to prevent unauthorized copying or tampering. The pattern identification unit 214 also supports the decoding of dynamic codes that use time-based color changes, enabling the representation of different data at different times. Pattern Identification Unit 214 might employ neural networks trained through machine learning to dynamically learn and adapt to new color patterns and geometrical shapes. This adaptability improves the unit's accuracy and flexibility, allowing it to handle a broader range of encoded information.

Translation Unit 216 may include suitable logic, circuitry, interfaces, and/or code that may be configured to transforms identified color patterns into meaningful information. The Translation Unit 216 takes the output from the Pattern Identification Unit which comprises various detected geometrical shapes, colors, and their spatial relationships and converts this data into user-readable information or Uniform Resource Locators (URLs). This translation process is essential for making the encoded information accessible and useful to the end-user. Translation Unit 216 utilizes predefined mappings stored on a database server to accurately interpret each color pattern as specific alphanumeric characters, symbols, or other types of data. The Translation Unit 216 ensures that the translation is both swift and precise, effectively bridging the gap between the abstract encoded patterns and practical, readable information, by referencing these mappings. Moreover, Translation Unit 216 is designed to handle dynamic and complex codes, including those with time-based color changes that represent different data at different times. This capability allows the unit 216 to decode a broader range of information, adapting to the evolving nature of the encoded data. Additionally, the unit supports the system's security measures by translating embedded security features, such as digital watermarks or encrypted sequences, which help prevent unauthorized copying or tampering. Translation Unit 216 may incorporate neural network algorithms that enhance its ability to learn and adapt to new color patterns and shapes over time. This machine-learning capability ensures continuous improvement in translation accuracy and flexibility. Ultimately, Translation Unit 216 is crucial for converting intricate and multi-dimensional encrypted codes into usable outputs, whether it be direct user-readable information or actionable URLs. The unit plays a vital role in the overall functionality and effectiveness of the decoding system, by ensuring the accurate and efficient translation of encoded data.

Display and Navigation Unit 218 may include suitable logic, circuitry, interfaces, and/or code that may be configured for presenting the decoded information to the user and facilitates subsequent actions. After the Translation Unit 216 converts the identified color patterns into user-readable information or Uniform Resource Locators (URLs), the Display and Navigation Unit 218 is responsible for delivering this information in an accessible and user-friendly manner. This unit 218 ensures that the decoded text, symbols, or URLs are displayed on the electronic device 108, allowing users to easily understand and interact with the information. The Display and Navigation Unit 218 also plays a crucial role in directing the user to web addresses defined by the decoded URLs. Once the translation process is complete, this unit can automatically direct the user to the appropriate web page, bypassing intermediate servers and URL softeners to maintain confidentiality and security. This seamless navigation to information enhances the user experience by providing immediate access to relevant online content without additional steps or delays.

Furthermore, the Display and Navigation Unit 218 may offer interactive features, such as touch inputs or voice commands, to improve user engagement and accessibility. For instance, users might customize their multi-dimensional encrypted codes directly through the interface provided by this unit, tailoring the codes for personal or business use. Additionally, for visually impaired users, the unit could incorporate tactile elements or auditory feedback to ensure the information is accessible through multiple sensory channels.

The Security and Integrity Unit 220 may include suitable logic, circuitry, interfaces, and/or code that may be configured for ensuring the protection and reliability of the decoded information. This unit is responsible for implementing various security measures to prevent unauthorized access, tampering, or manipulation of the encoded data. The Security and Integrity Unit 220 oversees the integrity of the decoding process, ensuring that the information obtained from the encrypted codes remains accurate and trustworthy. One of the primary functions of the Security and Integrity Unit 220 is to detect and mitigate potential security threats, such as attempts to intercept or modify scanned data during transmission. Unit 220 employs encryption protocols and secure communication channels to safeguard the integrity of the data as it travels between the electronic device 108 and the application server 104. Additionally, the unit may implement authentication mechanisms to verify the identity of users and ensure that only authorized individuals can access the decoded information.

Furthermore, the Security and Integrity Unit 220 is responsible for validating the authenticity of the multi-dimensional encrypted codes themselves. Unit 220 verifies the presence of embedded security features, such as digital watermarks or encrypted color sequences, which serve as indicators of the code's origin and authenticity. This validation process helps prevent counterfeiting or unauthorized reproduction of the codes. Moreover, the unit incorporates error detection and correction techniques to ensure the accuracy of the decoding process, even in the presence of noise or data corruption. Security and Integrity Unit 220 maintains the reliability and consistency of the decoded information, enhancing user confidence in the system, by identifying and rectifying errors.

Error Correction Unit 222 may include suitable logic, circuitry, interfaces, and/or code that may be configured for ensuring the accuracy and reliability of the decoding process. This unit 222 employs sophisticated techniques to detect and rectify errors that may occur during the scanning and decoding of multi-dimensional encrypted codes. Errors can arise due to various factors, including noise in the captured images, distortion of the encoded patterns, or data corruption during transmission. The Error Correction Unit 222 utilizes advanced algorithms to identify and analyze discrepancies between the expected color patterns and the detected patterns within the scanned images. Unit 222 can pinpoint areas where errors have occurred, by comparing the observed patterns with predefined templates or expected configurations. Unit 222 applies error correction techniques to rectify these discrepancies and reconstruct the correct information, once errors are identified. These error correction techniques may include methods such as forward error correction, which adds redundant information to the encoded data to enable the reconstruction of missing or corrupted portions. Additionally, unit 222 may implement error detection codes, such as checksums or cyclic redundancy checks, to verify the integrity of the decoded information and detect any remaining errors after correction. Moreover, the Error Correction Unit 222 adapts to the specific characteristics of the multi-dimensional encrypted codes and the scanning environment to optimize its error correction capabilities. Error Correction Unit 222 dynamically adjusts its parameters based on factors such as the level of noise in the captured images or the complexity of the encoded patterns, ensuring robust error correction performance under varying conditions. Unit 222 works closely with the Security and Integrity Unit 220.

The neural network unit 224 may include suitable logic, circuitry, interfaces, and/or code that may be configured for enhancing the accuracy and adaptability of the decoding process. This unit 224 employs neural network algorithms to dynamically learn and adapt to new color patterns and geometrical shapes encountered during the decoding process. The neural network unit 224 continuously analyzes and refines its understanding of the encoded data, improving decoding accuracy and flexibility over time, through machine learning techniques. The neural network unit 224 operates by training on a diverse dataset of multi-dimensional encrypted codes, allowing it to recognize and categorize different color patterns and geometrical shapes. The neural network unit 224 encounters new patterns during the decoding process, it adjusts its internal parameters and connections to better align with the observed data. This adaptive learning enables the neural network unit to effectively decode a wide range of encoded information, even in the presence of previously unseen patterns or variations.

Moreover, the neural network unit 224 contributes to the system's resilience by enhancing its error correction capabilities. The neural network unit 224 can assist in the error detection and correction process, improving the overall reliability of the decoded information, by identifying patterns in the data indicative of errors or inconsistencies. Additionally, the neural network unit 224 may optimize its decoding strategies based on feedback mechanisms, continuously refining its performance to achieve higher levels of accuracy and efficiency. Furthermore, the neural network unit 224 offers scalability and versatility, allowing it to adapt to evolving encoding techniques and emerging security features. As new color patterns and geometrical shapes are introduced, the neural network unit 224 can quickly assimilate this information and incorporate it into its decoding algorithms, ensuring compatibility with future encoding standards.

The neural network unit 224 integrated into the method for decoding information from the multi-dimensional encrypted code will serve multiple critical functions to enhance the overall system's performance and efficiency. In addition to its primary role of dynamically learning and adapting to new color patterns and geometrical shapes for improved accuracy and flexibility in decoding, the neural network unit will also provide additional multiprocessing capabilities. These capabilities will enable the system to handle multiple tasks simultaneously, significantly speeding up the process of locating and providing user-requested information. The neural network unit can perform parallel processing, allowing it to manage complex computations and data analysis more effectively. This results in quicker identification and translation of the encrypted code patterns into user-readable information or URLs, ultimately enhancing the user experience by delivering faster and more accurate results. Moreover, the multiprocessing capabilities will support the system in managing larger volumes of data and handling more intricate patterns, ensuring robust performance even under demanding conditions. This integrated approach of utilizing the neural network unit for both adaptive learning and multiprocessing underscores the method's commitment to efficiency, speed, and reliability in decoding and delivering information.

User Interface Unit 226 may include suitable logic, circuitry, interfaces, and/or code that may be configured to serves as the bridge between the user and the decoding system, facilitating intuitive interactions and customization options. This unit 226 provides users with a visually appealing and user-friendly interface through which they can initiate scanning, view decoded information, and customize decoding settings. The User Interface Unit 226 presents a graphical representation of the scanning process, guiding users through each step and providing feedback on the scanning progress. Additionally, it offers options for users to customize and generate personalized multi-dimensional encrypted codes for various purposes, whether for personal use or business applications. Moreover, the User Interface Unit 226 enables users to interact with the decoded information by displaying it in a clear and comprehensible format. Users can easily view the decoded text, symbols, or URLs and take appropriate actions based on the information provided. For instance, unit 226 may include features for directly accessing web addresses defined by the decoded URLs, allowing users to seamlessly navigate to relevant online content. Furthermore, the User Interface Unit 226 enhances accessibility by offering multiple input modalities, such as touch inputs, voice commands, or gestures. This ensures that users with different preferences and abilities can effectively interact with the decoding system. Additionally, unit 226 may incorporate accessibility features to support visually impaired users, such as voice feedback or tactile elements that provide alternative means of accessing the decoded information.

The Spectral Analysis Unit 228 may include suitable logic, circuitry, interfaces, and/or code that may be configured for analyzing subtle color variations within the encoded patterns. This unit 228 utilizes spectral analysis techniques to distinguish between different wavelengths of light, enabling it to extract detailed information from the encoded colors. The Spectral Analysis Unit 228 can uncover additional layers of information that may not be readily apparent through conventional means, by examining the spectral signatures of the colors present in the multi-dimensional encrypted codes. The Spectral Analysis Unit 228 enhances the decoding process by expanding the range of information that can be encoded within the same physical space. Unit 228 enables the encoding of richer and more complex data sets, enhancing the system's versatility and data storage capacity, by leveraging the full spectrum of colors available. Moreover, the unit's ability to detect subtle color variations allows for greater precision in decoding, reducing the likelihood of decoding errors and improving overall accuracy.

Furthermore, The Spectral Analysis Unit 228 contributes to the system's security by providing an additional layer of complexity to the encoded patterns. Spectral Analysis Unit 228 increases the difficulty of unauthorized copying or tampering with the encoded data, by encoding information using specific combinations of colors across different wavelengths. This makes it more challenging for malicious actors to decipher or alter the encoded information without proper authorization.

The Accessibility Unit 230 may include suitable logic, circuitry, interfaces, and/or code that may be configured for ensuring that the decoding system is accessible to users of diverse needs and abilities. This unit 230 is dedicated to enhancing the usability and inclusivity of the decoding process by providing features and accommodations that cater to individuals with different sensory, motor, and cognitive abilities. The Accessibility Unit 230 incorporates various accessibility features into the user interface, allowing users to interact with the decoding system effectively regardless of their physical or cognitive limitations. One key aspect of Accessibility Unit 230 is providing alternative input modalities to accommodate users who may have difficulty using traditional input methods. For example, the unit may offer voice command functionality, allowing users to control the decoding process using spoken commands rather than manual inputs. Additionally, it may incorporate gesture-based controls or touch inputs to provide alternative means of interaction for users with mobility impairments.

Furthermore, Accessibility Unit 230 ensures that the decoded information is presented in formats that are accessible to users with visual impairments. This may include providing options for larger text sizes, high-contrast color schemes, or text-to-speech functionality to accommodate users who rely on screen readers or other assistive technologies. Additionally, the unit may incorporate tactile elements into the user interface, allowing users to perceive and interact with the decoded information through touch. Moreover, Accessibility Unit 230 plays a crucial role in ensuring that the decoding system complies with accessibility standards and guidelines, such as the Web Content Accessibility Guidelines (WCAG). By adhering to these standards, the unit ensures that the decoding system is usable and accessible to a wide range of users, including those with disabilities.

The tactile unit 232 may include suitable logic, circuitry, interfaces, and/or code that may be configured for decoding information in a multi-dimensional encrypted code includes a feature. The code can incorporate tactile elements, making it accessible for visually impaired users. These tactile unit 232 can be felt by touch, allowing individuals who are visually impaired to decode the information using tactile feedback in addition to visual means. This dual approach not only enhances accessibility but also broadens the usability of the encrypted code. The inclusion of tactile unit 232 means that the code can be designed with raised patterns or textures that correspond to the encoded information, ensuring that the data can be interpreted through both visual and tactile modalities. This innovative aspect of the multi-dimensional encrypted code allows it to serve a wider audience and enhances its functionality in diverse environments.

Dynamic information unit 234 may include suitable logic, circuitry, interfaces, and/or code that may be configured for decoding information in a multi-dimensional encrypted code introduces the dynamic information unit 234. The code incorporates time-based color changes. This feature allows the encrypted code to represent different data at different times, effectively enabling the encoding of dynamic information. The code can update or change the information it conveys based on temporal parameters, by leveraging time-based color variations. Code becomes highly versatile and adaptable to various contexts. For example, a single code could convey different promotional messages or access credentials depending on the time of day or a specific time interval. This dynamic aspect enhances the code's utility in real-time applications. The dynamic information unit 234 provides a sophisticated means of data representation beyond static encoding, ensuring that the information remains relevant and up-to-date.

In an exemplary operation, the electronic device 108 is configured to scan a multi-dimensional encrypted code using an image sensor. In an embodiment, the multi-dimensional encrypted code is colored. Further, in an embodiment, an electronic device 108 is configured to identify one or more color patterns within the multi-dimensional encrypted code, each of the one or more color patterns is indicative of one or more alphanumeric characters, one or more symbols, and capitalization. In an embodiment, the electronic device 108 is configured to translate the identified one or more color patterns into at least one user-readable information or a Uniform Resource Locator (URL). In an embodiment, the electronic device 108 is configured to provide at least one of the user readable information to a user and an electronic device directs the user to a web address defined by the Uniform Resource Locator (URL). In an embodiment, the multi-dimensional encrypted code comprises a bar code or QR code. In an embodiment, the multi-dimensional encrypted code includes embedded security features such as digital watermarks or encrypted color sequences to prevent unauthorized copying or tampering. In an embodiment, upon scanning of the multi-dimensional encrypted code intermediate servers and URL shorteners are bypassed to provide direct access to user-readable information and the web address in a confidential manner. In an embodiment, the multi-dimensional encrypted code comprises one or more geometrical shapes spaced at a pre-defined distance from each other within a pre-defined boundary.

In an embodiment, the size of one or more geometrical shapes is different. In an embodiment, the size of one or more geometrical shapes is the same. In an embodiment, a distance between each of one or more geometrical shapes of the same size is identified as the first pattern from one or more color patterns. In an embodiment, a distance between each of one or more geometrical shapes of different sizes is identified as a second pattern from one or more color patterns. In an embodiment, each of one or more geometrical shapes is of multiple colors. In an embodiment, a distance between geometrical shapes of multiple colors is identified as a third pattern. In an embodiment, one or more color patterns are identified based on the size, shape, color, and distance between each of one or more geometrical shapes. In an embodiment, the disclosed method employs a neural network trained using machine learning techniques to dynamically learn and adapt to new color patterns and geometrical shapes for improved accuracy and flexibility in decoding.

In an embodiment, the neural network is configured to identify one or more variations of the geometrical shapes of the plurality of colors to further enhance data storage and retrieval mechanisms. Further, an embodiment comprises mapping a specific sequence of a plurality of colors to corresponding characters or sets of characters for forming the URL. In an embodiment, an error correction technique to accurately decode the multi-dimensional encrypted code even when the multi-dimensional encrypted code is partially damaged or obscured is also utilized by the disclosed method to improve accuracy. Further, a user interface allows users to customize and generate personalized multi-dimensional encrypted codes for personal or business use. In an embodiment, the multi-dimensional encrypted code comprises time-based color changes to encode dynamic information, allowing the code to represent different data at different times. In an embodiment, the electronic device uses spectral analysis to distinguish between subtle colors variations, allowing for a greater range of information to be encoded within the same physical space. In an embodiment, the multi-dimensional encrypted code includes tactile elements that can be felt by touch, providing accessibility for visually impaired users and allowing the code to be decoded through both visual and tactile means.

Figure 3:
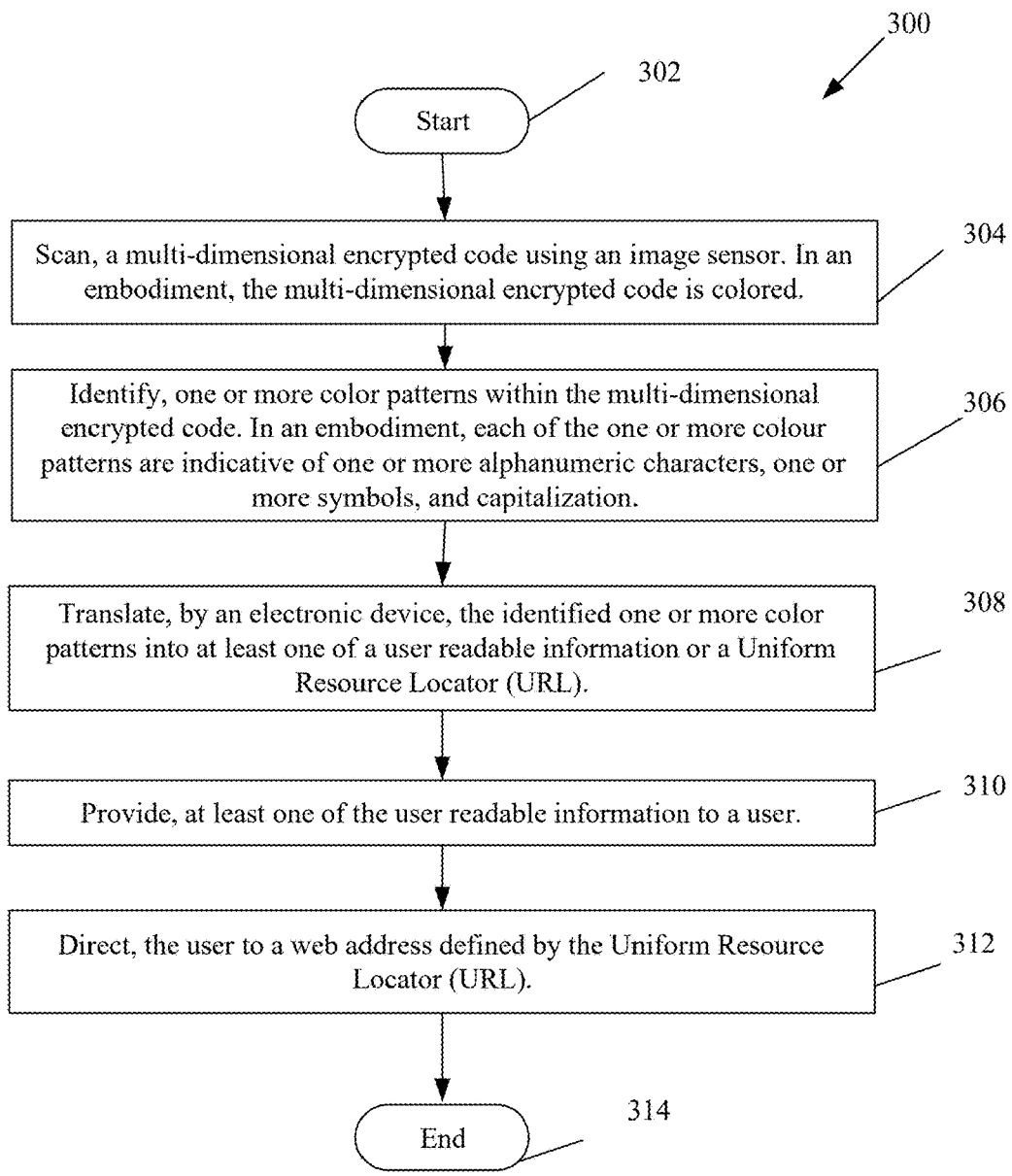
FIG. 3 is a flowchart that illustrates a method for decoding information in a multi-dimensional encrypted code, in accordance with an embodiment of present invention.

FIG. 3 is a flowchart that illustrates a method for decoding information in a multi-dimensional encrypted code, in accordance with an embodiment of present disclosure. The method begins in a start step 302 and proceeds to step 304. At step 304, the electronic device scans a multi-dimensional encrypted code using an image sensor. In an embodiment, the multi-dimensional encrypted code is colored. At step 306, the electronic device identifies one or more color patterns within the multi-dimensional encrypted code. In an embodiment, each of one or more color patterns is indicative of one or more alphanumeric characters, one or more symbols, and capitalization. At step 308, the electronic device translates the identified one or more color patterns into at least one user-readable information or a Uniform Resource Locator (URL). At step 310, the electronic device provides at least one of the user readable information to a user. At step 312, the electronic device directs the user to a web address defined by the Uniform Resource Locator (URL). Control passes end step 314.

Figure 4A:
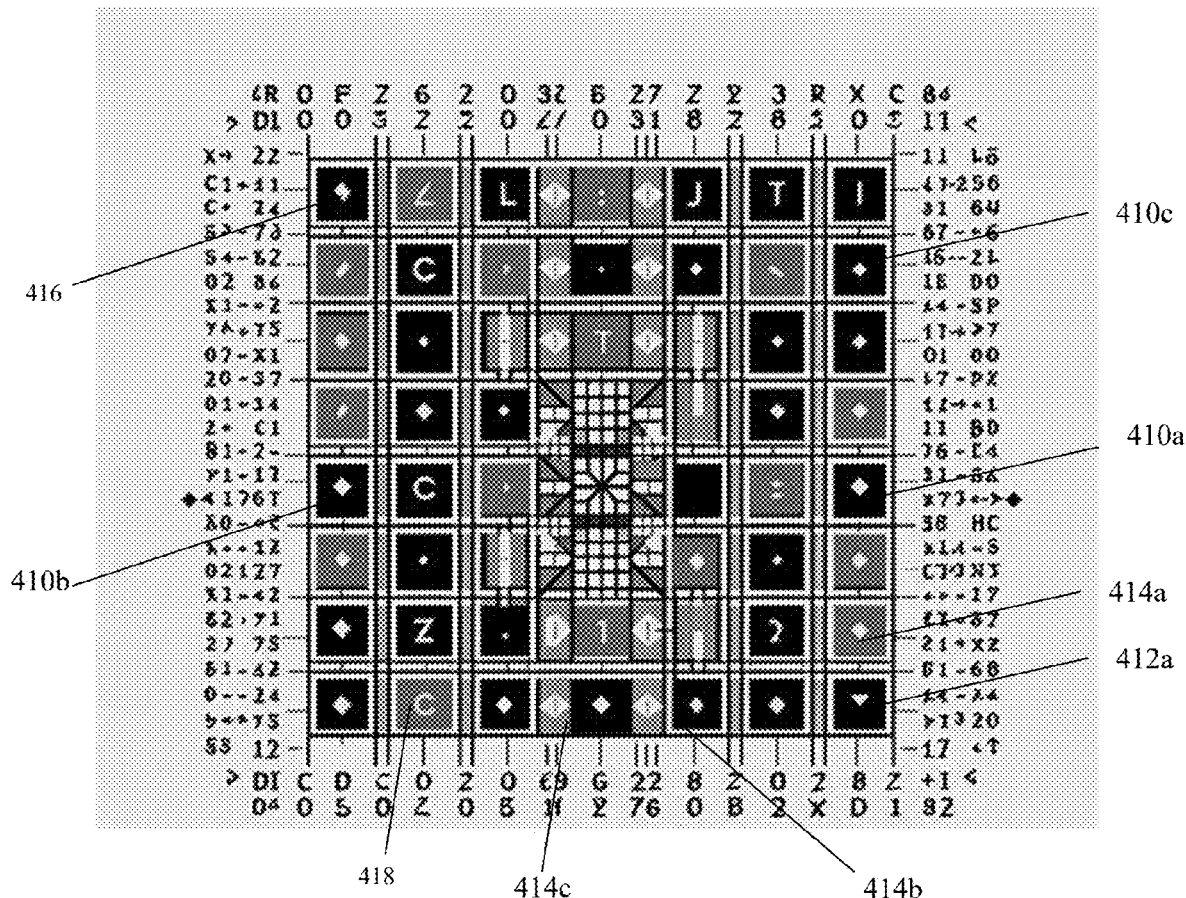
FIG. 4A illustrates a sample multi-dimensional encrypted code printed on a product label, and the multi-dimensional encrypted code is a square matrix consisting of colored geometric shapes, each representing a specific alphanumeric character or symbol and each shape represents either a black (O), red (A), or white (O) color.

FIG. 4A illustrates a sample multi-dimensional encrypted code printed on a product label, and the multi-dimensional encrypted code is a square matrix consisting of colored geometric shapes 416, each representing a specific alphanumeric character 418 or symbol and each shape represents either a black (O) 410a, red (A) 410b, or white (O) 410c color. Each color is associated with a distinct geometric shape to enhance the encoding capacity and readability. Specifically, a black square (0) 410a represents one set of characters or symbols, a red triangle (A) 410b represents another set, and a white circle (O) 410c represents yet another set. This encoding method allows a significant amount of information to be compactly and securely embedded within the matrix. The unique combination of colors and shapes provides a robust means of data representation, which can be effectively decoded using the appropriate scanning and decoding technology. The resulting decoded information can include various details such as product information, manufacturing details, or any other data deemed necessary to be embedded in the code. This multi-dimensional approach enhances the security and versatility of the encrypted code, making it suitable for a wide range of applications.

Figure 4B:
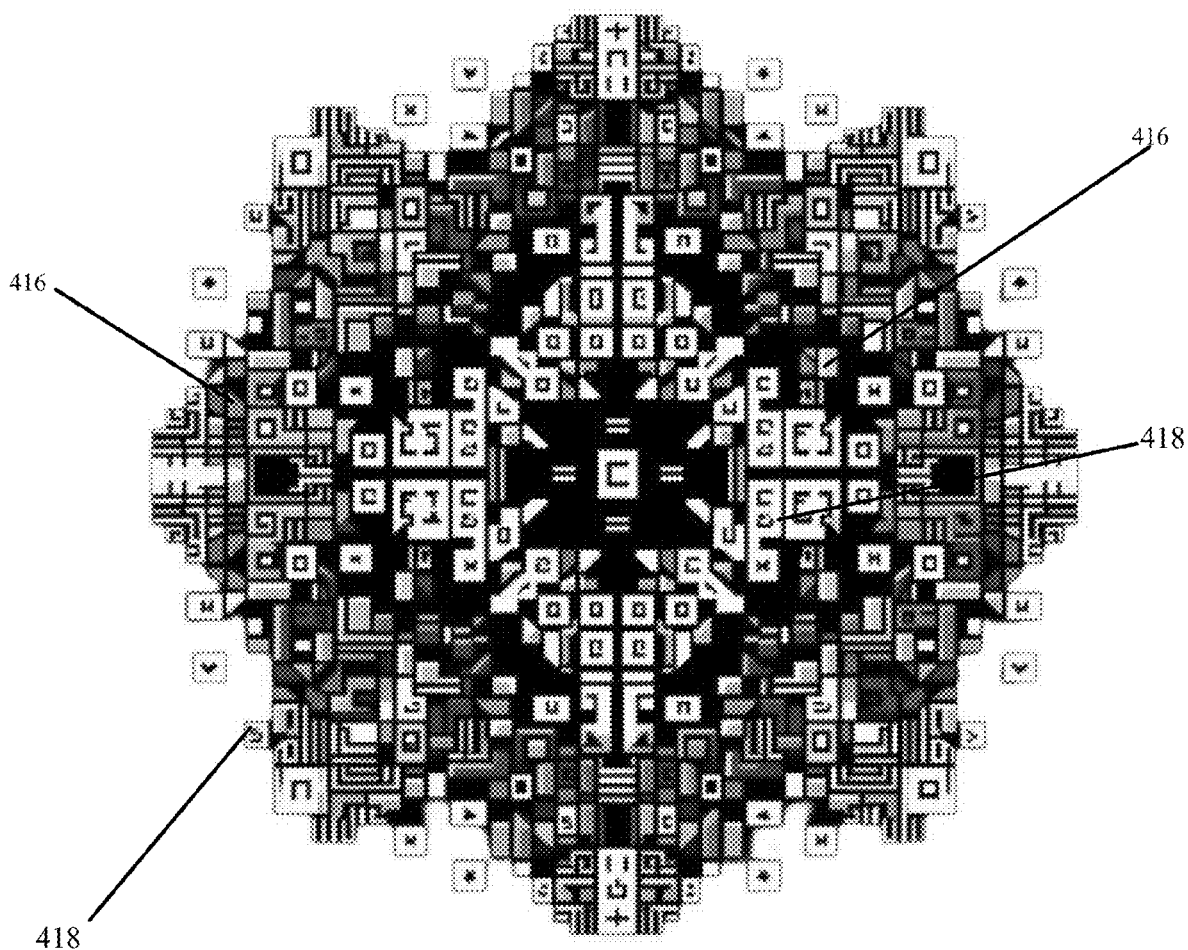
FIG. 4B illustrates another sample multi-dimensional encrypted code printed on a product label, and the multi-dimensional encrypted code is a square matrix consisting of colored geometric shapes.

FIG. 4B illustrates another sample multi-dimensional encrypted code printed on a product label, and the multi-dimensional encrypted code is a square matrix consisting of colored geometric shapes 416. Similar to the code depicted in FIG. 4A, this code is also designed as a square matrix, composed of various colored geometric shapes. Each shape within the matrix represents specific alphanumeric characters 418 or symbols, allowing for a compact and secure method of data encoding. The use of colored geometric shapes 416 enhances the code's capacity to store detailed information, which can include product specifications, manufacturing data, and other relevant information. The arrangement of these shapes within the matrix ensures that the encoded data is not only secure but also easily scannable and decodable with the appropriate technology. This multi-dimensional approach to data encryption allows for greater flexibility and robustness compared to traditional barcodes or QR codes, providing a more sophisticated means of embedding and retrieving information from product labels. The encoded information can be reliably decoded by a scanning device equipped with pattern recognition and color detection capabilities, ensuring that the data is accurately translated and presented to the user.

Figure 4C:
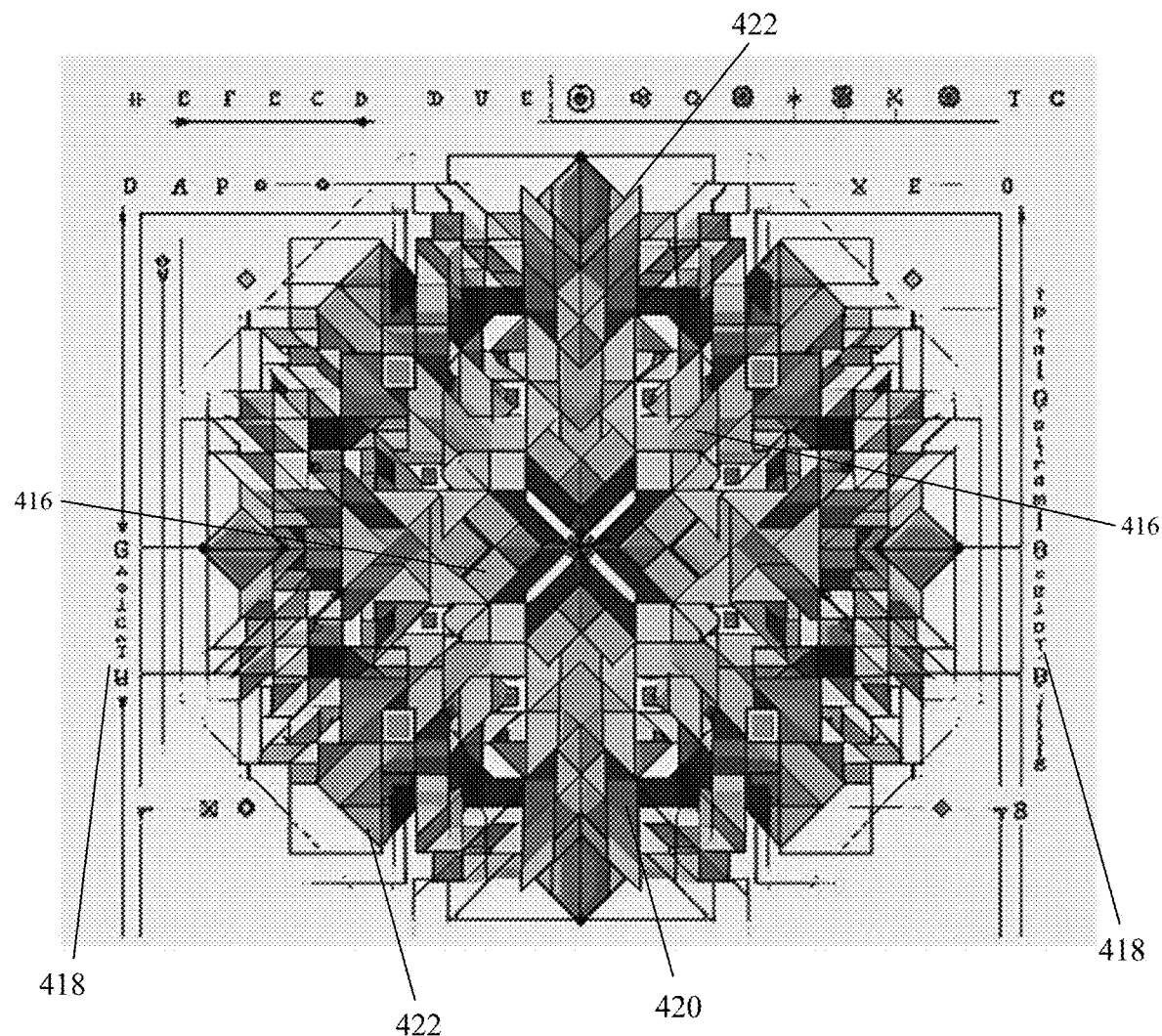
FIG. 4C illustrates another sample multi-dimensional encrypted code printed on a product label, and the multi-dimensional encrypted code is a square matrix consisting of colored geometric shapes.

FIG. 4C illustrates another sample multi-dimensional encrypted code printed on a product label, and the multi-dimensional encrypted code is a square matrix consisting of colored geometric shapes 416. This code is like those in FIG. 4A and FIG. 4B, is structured as a square matrix composed of various colored geometric shapes 416. Each geometric shape within the matrix encodes specific alphanumeric characters 418 or symbols, facilitating a secure and compact method of data storage. The matrix format allows for a high density of information to be encoded within a relatively small area. The shapes are colored, enabling an additional layer of data representation beyond simple geometric configuration. This multi-dimensional encoding method ensures that the data embedded within the code is not only secure but also resistant to errors and easy to decode using the proper scanning technology.

The decoding process involves capturing a high-resolution image of the code, analyzing the color patterns 420 and geometric shapes, and translating them into readable information. This information can include a wide range of details, such as product attributes, manufacturing information, or other relevant data. The use of multiple colors and shapes 422 provides a versatile and robust means of data encryption, making the code highly adaptable for various applications. The encoded information is designed to be accurately retrievable even in challenging conditions, such as when the label is partially damaged or worn. This resilience, combined with the high data capacity and security of the multi-dimensional code, makes it a valuable tool for product labeling and information dissemination.

Figure 5:
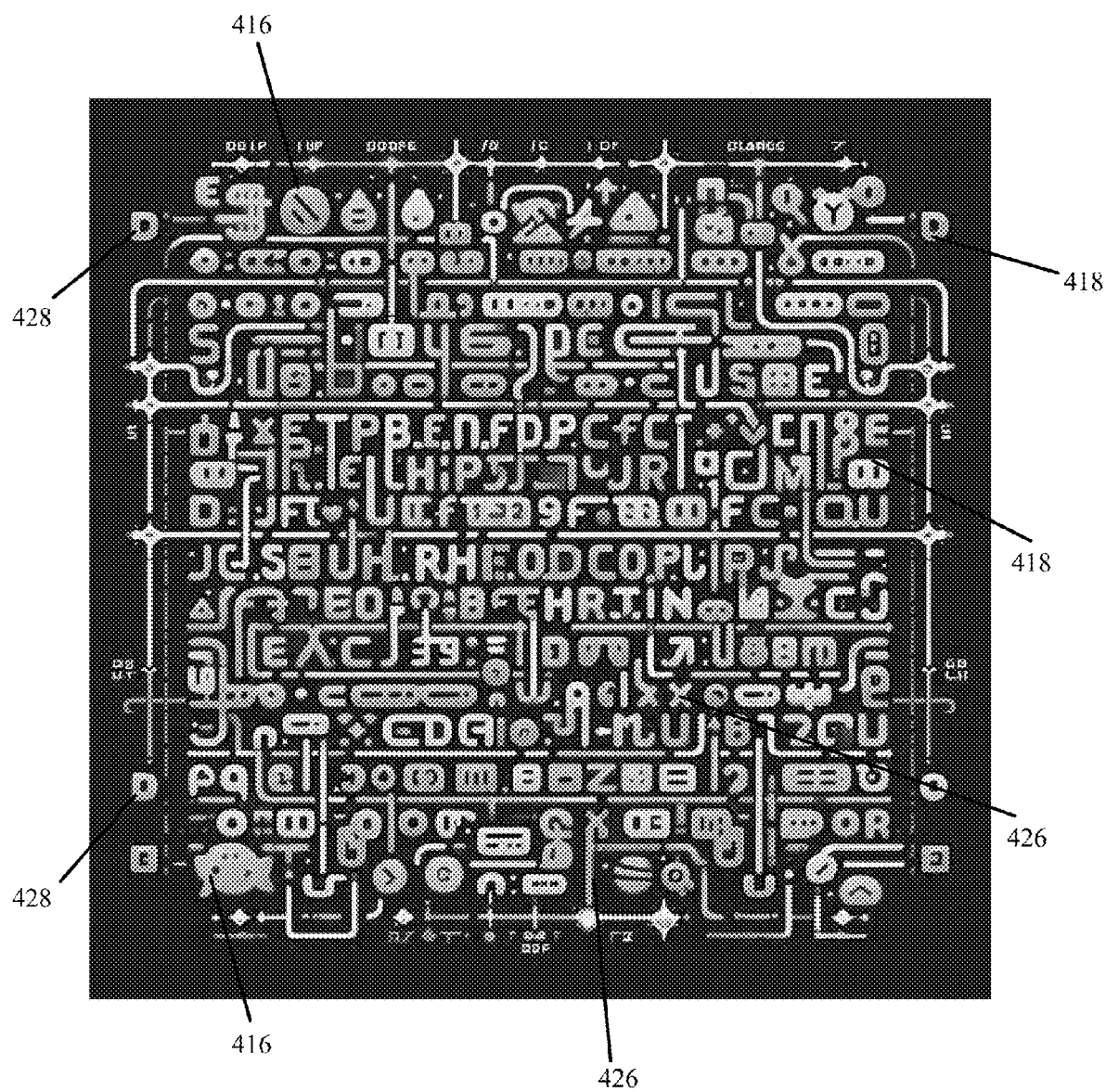
FIG. 5 shows an illustrative multidimensional encrypted color code that shows different size of geometric shapes, the distance between these shapes, and their color can be used to encode and decode a URL.

FIG. 5 shows an illustrative multidimensional encrypted color code that shows different size of geometric shapes 416, the distance between these shapes, and their color can be used to encode and decode a URL. This multi-faceted approach to encryption enhances the complexity and security of the encoded information. This code uses different geometric shapes 416 that vary in size, unlike traditional barcodes or QR codes that rely on a uniform grid pattern. The size of each shape can represent different data points, adding an additional layer of information to the code. The distance between these shapes 424 is another critical factor in the encoding process. By varying the spacing between shapes, more data can be embedded within the same area, increasing the overall data density of the code. This spatial variation helps to create a more intricate pattern that can store more complex information, such as a complete URL. The color of each geometric shape further enhances the encoding capacity. Different colors can represent different characters or sets of characters, allowing for a more detailed and nuanced encoding scheme. A scanner or smartphone app captures a high-resolution image of the code and analyzes the geometric shapes 416, their sizes, the distances between them, and their colors, to decode the information. The decoding algorithm interprets these variations to reconstruct the encoded URL accurately. This multi-dimensional approach ensures that the URL is securely encoded, minimizing the risk of data corruption or unauthorized access.

The combination of shape size 426, distance, and color 428 provides a robust and versatile method of data encryption that is highly resistant to errors and tampering. This makes it particularly useful for applications where data security and integrity are paramount. The multi-dimensional encrypted color code, by using such a complex encoding scheme in FIG. 5 offers a sophisticated solution for embedding URLs and other critical information in a compact, secure format.

In a working but non-limiting example of the aforementioned disclosure, the described method for decoding multi-dimensional encrypted codes is disclosed. Imagine you're at a conference, and each attendee has a badge with a multi-dimensional encrypted code printed on it. The code contains information such as the attendee's name, organization, and contact details, encoded in colored geometric shapes arranged in a QR code-like pattern. You decide to scan a colleague's badge using your smartphone, which has an integrated scanning app equipped with the described method's functionalities. As you point your smartphone's camera at the badge, the app's image sensor captures a high-resolution image of the multi-dimensional encrypted code. The Pattern Identification Unit within the app analyzes the captured image, identifying the color patterns and geometrical shapes within the code. The Pattern Identification Unit recognizes each pattern as representing specific alphanumeric characters and decodes the information accordingly. Next, the Translation Unit translates the decoded patterns into readable text, presenting your colleague's name, organization, and contact details on your smartphone screen. Additionally, the app recognizes a URL embedded within the code and directs you to the relevant web page, providing further details about your colleague's organization. Meanwhile, the Error Correction Unit ensures the accuracy of the decoded information, correcting any errors or inconsistencies detected during the decoding process. This ensures that the information presented on your smartphone is reliable and accurate. Furthermore, the User Interface Unit provides a user-friendly interface that guides you through the scanning process and displays the decoded information in a clear and comprehensible format. It also offers options for customizing the decoding settings, such as adjusting the display preferences or enabling accessibility features for visually impaired users. The following figures (FIG. 4A, FIG. 4B, FIG. 4C) are illustrations of working examples provided herewith. FIG. 4A illustrates a sample multi-dimensional encrypted code printed on a product label, and the multi-dimensional encrypted code is a square matrix consisting of colored geometric shapes 416, each representing a specific alphanumeric character or symbol, and each shape represents either a black (O), red (A), or white (O) color, FIG. 4B illustrates another sample multi-dimensional encrypted code printed on a product label, and the multi-dimensional encrypted code is a square matrix consisting of colored geometric shapes and FIG. 4C illustrates another sample multi-dimensional encrypted code printed on a product label, and the multi-dimensional encrypted code is a square matrix consisting of colored geometric shapes.

Let us consider another detailed working example of the disclosure. Imagine you have a multi-dimensional encrypted code printed on a product label. The code is a square matrix consisting of colored geometric shapes, each representing a specific alphanumeric character or symbol. Each shape represents either a black (O), red (A), or white (O) color. Let's decode this code using the method outlined in the disclosure. You use a smartphone app equipped with the method's functionalities to scan the code. The app's image sensor captures the image and sends it for processing. Further, the pattern identification unit analyzes the image and identifies color patterns.

For example:
Black (□) represents letters A-F.
Red (Δ) represents letters G-L.
White (O) represents letters M-R.

Further, Translation Unit translates the identified patterns into alphanumeric characters based on the color scheme:
Black (□)—A
Red (Δ)—G
White (O)—M After decoding the code, we get: "ABCDEF GHIJKL MOPQRS". Further, the Error Correction Unit ensures accuracy by detecting and correcting any errors. For example, if a shape is misidentified due to noise, the unit corrects it to the nearest valid pattern. User interface unit 216 displays the decoded information on the smartphone screen: "ABCDEF GHIJKL MOPQRS". Further, if the code contains a URL, the app directs you to the relevant web page, providing additional information about the product. In this example, the present disclosure successfully decodes the multi-dimensional encrypted code, providing accurate and reliable information to the user. Each step of the process, from scanning to navigation, is carried out seamlessly, demonstrating the effectiveness and practicality of the method. The following figure (FIG. 5) is an illustration of a working example provided herewith. FIG. 5 shows an illustrative multidimensional encrypted color code. This figure highlights that different sizes of geometric shapes, the distance between these shapes, and their color can be used to encode and decode a URL. The shapes' size and placement add an additional layer of information, making the code more robust and secure. The smartphone app's processing units analyze these additional parameters to ensure accurate decoding and error correction, ultimately enhancing the user's experience by providing seamless access to encoded URLs.

In another working example let us understand how encoding a URL works simply with just colors. A URL like "http://example.com" is encoded using specific color and geometric patterns. The sequence of colors and shapes directly represents the URL characters. In the decoding Process, the scanner detects the colors and shapes. The software translates these patterns back into the URL. The device then directs the user to "http://example.com" without needing any external server. The present disclosure allows encoding a wide array of data securely and efficiently, leveraging color and geometric patterns for robust information encoding and decoding.

Another working example demonstrates how the size of geometric shapes, the distance between these shapes, and their color can be used to encode and decode a URL
Example URL: http://example.com
Encoding Scheme
Colors:
  Red='h'
  Green='t'
  Blue='p'
  Yellow=':'
  Cyan='/'
  Magenta='e'
  Orange='x'
  Purple='a'
  Brown='m'
  Pink='l'
  Grey='o'

Black='.'
White='c'
Shape Sizes (representing digits):
Small='1'
Medium='2'
Large='3'
Distance between Shapes (representing punctuation or additional characters):
Short distance='-'
Medium distance='='
Long distance='_'
Encoding the URL We will encode the URL http://example.com using a combination of color, shape size, and distance between shapes.

Here is the breakdown:
Short distance→characters continue as part of the string.
Medium distance→represents '/' or another special character.
Characters:
h→Red
t→Green
t→Green
p→Blue
:→Yellow
/→Cyan
/→Cyan
e→Magenta
x→Orange
a→Purple
m→Brown
p→Blue
l→Pink
e→Magenta
.→Black
c→White
→Grey
m→Brown Digits (if any): Not applicable in this URL but if there were digits, we would use size variations.

For simplicity, let's use distances to encode the: //part of the URL:
:→Yellow (short distance to next character)
/→Cyan (medium distance to next character)
/→Cyan (medium distance to next character)

By combining color, shape size, and distance between shapes, we can create a rich, multi-dimensional encrypted code that encodes complex information like a URL as shown in Table A below. This approach allows for secure, efficient encoding and decoding, leveraging the spatial and color capabilities of modern scanning technology.

TABEL A

| Shape 1 | Red (h) | short distance |
|---|---|---|
| Shape 2 | Green (t) | short distance |
| Shape 3 | Green (t) | short distance |
| Shape 4 | Blue (p) | short distance |
| Shape 5 | Yellow ( ) | short distance |
| Shape 6 | Cyan (/) | medium distance |
| Shape 7 | Cyan (/) | medium distance |
| Shape 8 | Magenta (e) | short distance |
| Shape 9 | Orange (x) | short distance |
| Shape 10 | Purple (a) | short distance |
| Shape 11 | Brown (m) | short distance |
| Shape 12 | Blue (p) | short distance |
| Shape 13 | Pink (l) | short distance |
| Shape 14 | Magenta (e) | short distance |
| Shape 15 | Black (.) | short distance |
| Shape 16 | White (c) | short distance |
| Shape 17 | Grey (o) | short distance |
| Shape 18 | Brown (m) | short distance |

Various embodiments of the disclosure encompass numerous advantages including the present disclosure significantly increases the data capacity of encoded codes compared to traditional methods like barcodes and QR codes, by utilizing multi-dimensional color patterns. This allows for the storage of larger volumes of information within the same physical space. The present disclosure incorporates embedded security features such as digital watermarks and encrypted color sequences to prevent unauthorized copying or tampering with the encoded data. This enhances the security and integrity of the information being transmitted or stored. Advanced error correction techniques and machine learning algorithms are employed to enhance the accuracy of decoding processes. This ensures that codes can be accurately decoded even when they are partially damaged, obscured, or subject to variations in size and shape. The present disclosure dynamically learns and adapts to new color patterns and geometrical shapes, improving flexibility in decoding processes. This enables the system to handle a wide range of encoded data formats and variations, thereby increasing its versatility. The present disclosure provides direct access to user-readable information and web addresses confidentially, bypassing intermediary servers and URL shortener. This reduces latency and enhances user privacy by eliminating potential points of interception. The precent disclosure includes a user interface that allows users to customize and generate personalized multi-dimensional encrypted codes. Additionally, features such as tactile elements cater to visually impaired users, making the system more accessible and user-friendly. The present disclosure supports time-based color changes, allowing the encoded data to represent different information at different times. This feature enables the representation of dynamic data, making the system suitable for applications requiring real-time updates or time-sensitive information dissemination.

The proposed enhancement to the existing multi-dimensional encrypted code method represents a significant advancement in the field of information encoding and retrieval. Currently, UPC barcodes, which are widely utilized in commerce, primarily function to resolve into a numeric string that can be processed at the point of sale (POS). This numeric string typically contains information about the product, such as its identification number, but lacks the capability to convey more complex data directly. These conventional codes can be transformed to function much more efficiently and hold a substantially larger amount of information, by introducing colorization into these UPC barcodes and employing the technology detailed herein.

Specifically, the color coding is not limited to a fixed number of colors. While the example provided references 19 primary colors, the color palette can be extended to include hundreds of derivative colors, significantly expanding the potential for encoding a wide range of data. Current color identification programs, as known in the art, are capable of accurately distinguishing both primary and derivative colors, allowing for precise data encoding and decoding. For instance, to code for the 26 letters of the alphabet (including capitalization), numbers 0-9, and approximately 10 symbols (such as /, ?, ., &, %, #, @, *, (, or)), an estimated palette of around 70 colors would be needed. This expanded color palette allows for the inclusion of all characters in a URL, including uppercase letters and symbols.

The implementation of such a system would exponentially increase the combinations available for encoding information. For example, with 6 spaces in the URL and 70 possible colors for each space, the total number of combinations would be an astronomical figure, specifically 6 to the power of 70combinations. This immense combinatorial capacity would enable a standard, but now colorized, UPC barcode to encode complex URLs such as "https://t.ly/ws9n4" seamlessly.

Beyond the capability to encode URLs, this technology provides a groundbreaking utility: enabling direct access to websites by scanning a colorized UPC barcode. Unlike traditional UPC barcodes, which are limited to numeric data for product identification and transaction processing at POS, the colorized UPC barcodes can be scanned by users to directly navigate to a specific website. This eliminates the need for URL shorteners, which are often used in QR codes, thereby streamlining the user experience and enhancing security by reducing the intermediary steps that could be exploited. Not only is the efficiency of current UPC barcodes in commerce enhanced, but the scope of information that can be encoded is vastly expanded, by integrating this advanced method. This technology allows for a more versatile and information-rich encoding system, paving the way for more sophisticated applications in various fields including retail, logistics, and digital marketing. The ability to directly access websites through a colorized UPC barcode marks a significant improvement in the art, offering a seamless blend of traditional barcode functionality with modern digital capabilities.

The present disclosure introduces a technical solution of using multi-dimensional encrypted codes with color patterns. This approach goes beyond traditional one-dimensional barcodes or two-dimensional QR codes, offering increased data capacity and security through the utilization of color-based encoding. The present disclosure incorporates advanced security features such as digital watermarks and encrypted color sequences within the multi-dimensional codes. These features enhance data integrity and prevent unauthorized copying or tampering, providing a more secure method of data transmission and storage. The present disclosure employs sophisticated decoding techniques, including error correction algorithms and machine learning for pattern recognition. These techniques improve the accuracy and flexibility of decoding processes, even in challenging conditions such as partial damage or variation in size and shape. The present disclosure provides direct access to user-readable information and web addresses confidentially, bypassing intermediary servers and URL shorteners. This approach reduces latency and enhances user privacy, which may not be obvious to those skilled in the art accustomed to traditional data transmission methods. The present disclosure supports dynamic data encoding through time-based color changes, allowing the encoded information to represent different data at different times. This feature adds a layer of versatility and adaptability to the encoding process, which may not have been obvious to those skilled in the art focused on static data encoding methods. Overall, the present disclosure involves a combination of technical features and methods that go beyond conventional approaches to data encoding and decoding. These features provide unique technical advantages in terms of data capacity, security, accuracy, and flexibility, making the invention non-obvious to a person skilled in the art.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. For instance, as color detection can be accomplished with wavelengths of light beyond what is considered the visible spectrum as defined by capacities of an average human (e.g., the ultraviolet and infrared spectra), this Specification should not be read to be limited just to the visible spectrum but may instead include "colors" beyond such limitation. Therefore, it is intended that the present disclosure is not limited to the particular embodiment disclosed, but that the present disclosure will include all embodiments falling within the scope of the appended claims

What is claimed is:

1. A method for decoding information in a multi-dimensional encrypted code, the method comprising:
    scanning, by an electronic device, a multi-dimensional encrypted code using an image sensor, wherein the multi-dimensional encrypted code comprises a combination of colors, geometric shapes, and varied spatial arrangements;
    determining, by an electronic device, a differentiation between subtle color variations and intricate shape arrangements within the multi-dimensional encrypted code using one or more image processing techniques;
    identifying, by an electronic device, at least one color patterns, shape variations, size variations, and spatial distributions within the multi-dimensional encrypted code based on the differentiation between subtle color variations and intricate shape arrangements within the multi-dimensional encrypted code, wherein each of the at least one color patterns are indicative of at least one encoded characters;

translating, by an electronic device, the identified at least one color patterns, shape variations, size variations, and spatial distributions into at least one of a user readable information or a Uniform Resource Locator (URL);

providing, by an electronic device, at least one of the user readable information to a user;

directing, by an electronic device, the user to a web address defined by the Uniform Resource Locator (URL), wherein the multi-dimensional encrypted code comprises time-based color changes to encode dynamic information, allowing the code to represent different data at different time intervals; and employing, by an electronic device, a neural network trained using machine learning techniques, the neural network being dynamically updated in real time based on newly encountered color patterns and geometrical shapes during scanning, wherein the neural network is configured to continuously improve identification of variations in geometrical shapes and plurality of colors to enhance accuracy, efficiency, data storage and retrieval mechanisms.

2. The method for decoding information in the multi-dimensional encrypted code as claimed in claim 1, wherein upon scanning of the multi-dimensional encrypted code, intermediate servers and URL shorteners are bypassed to provide direct access to user readable information and the web address in a confidential manner.

3. The method for decoding information in the multi-dimensional encrypted code as claimed in claim 1, wherein the multi-dimensional encrypted code comprises a barcode, and wherein the multi-dimensional encrypted code includes embedded security features to prevent unauthorized copying or tampering.

4. The method for decoding information in the multi-dimensional encrypted code as claimed in claim 1, wherein the multi-dimensional encrypted code comprises at least one geometrical shapes spaced at a pre-defined distance from each other within a pre-defined boundary.

5. The method for decoding information in the multi-dimensional encrypted code as claimed in claim 1, wherein a size of the at least one geometrical shapes is different.

6. The method for decoding information in the multi-dimensional encrypted code as claimed in claim 1, wherein a size of the one or more at least one geometrical shapes is same.

7. The method for decoding information in the multi-dimensional encrypted code as claimed in claim 1, wherein a distance between each of the at least one geometrical shapes of same size is identified as a first pattern.

8. The method for decoding information in the multi-dimensional encrypted code as claimed in claim 1, wherein each of the at least one geometrical shapes are of multiple colors, wherein a distance between geometrical shapes of multiple colors is identified as a third pattern.

9. The method for decoding information in the multi-dimensional encrypted code as claimed in claim 1, wherein each of the at least one geometrical shapes are of multiple colors, wherein a distance between geometrical shapes of multiple colors is identified as a third pattern.

10. The method for decoding information in the multi-dimensional encrypted code as claimed in claim 1, wherein the at least one color patterns being identified based on a size, shape, color, and distance between each of the at least one geometrical shapes.

11. The method for decoding information in the multi-dimensional encrypted code as claimed in claim 1, further comprising mapping a specific sequence of a plurality of colors to corresponding characters for forming the URL.

12. The method for decoding information in the multi-dimensional encrypted code as claimed in claim 1, further comprising an error correction technique to accurately decode the multi-dimensional encrypted code even when the multi-dimensional encrypted code is partially damaged or obscured.

13. The method for decoding information in the multi-dimensional encrypted code as claimed in claim 1, further comprising a user interface that allows users to customize and generate personalized multi-dimensional encrypted codes.

14. The method for decoding information in the multi-dimensional encrypted code as claimed in claim 1, wherein the electronic device uses spectral analysis to distinguish between subtle color variations, allowing for a greater range of information to be encoded within the same physical space.

15. The method for decoding information in the multi-dimensional encrypted code as claimed in claim 1, wherein the multi-dimensional encrypted code includes tactile elements that can be felt by touch, providing accessibility for visually impaired users and allowing the code to be decoded through both visual and tactile means.

16. An electronic device to decode information in a multi-dimensional encrypted code, the electronic device comprising:

a processor; and a memory communicatively coupled to the processor, wherein the memory stores processor instructions, which, on execution, causes the processor to:

scan a multi-dimensional encrypted code using an image sensor, wherein the multi-dimensional encrypted code comprises a combination of colors, geometric shapes, and varied spatial arrangements;

determine a differentiation between subtle color variations and intricate shape arrangements within the multi-dimensional encrypted code using one or more image processing techniques identify at least one color patterns, shape variations, size variations, and spatial distributions within the multi-dimensional encrypted code based on the differentiation between subtle color variations and intricate shape arrangements within the multi-dimensional encrypted code, wherein each of the at least one color patterns are indicative of at least one encoded characters;

translate the identified at least one color patterns, shape variations, size variations, and spatial distributions into at least one user readable information and a Uniform Resource Locator (URL);

provide at least one of the user readable information to a user;

direct the user to a web address defined by the Uniform Resource Locator (URL), wherein the multi-dimensional encrypted code comprises time-based color changes to encode dynamic information, allowing the code to represent different data at different time intervals; and employ a neural network trained using machine learning techniques, the neural network being dynamically updated in real time based on newly encountered color patterns and geometrical shapes during scanning, wherein the neural network is configured to continuously improve identification of variations in geometrical shapes and plurality of colors to enhance accuracy, efficiency, data storage and retrieval mechanisms.

17. The electronic device as claimed in claim 16, wherein the processor is configured upon scanning of the multi-dimensional encrypted code so that intermediate servers and URL shorteners are bypassed to provide direct access to user readable information and the web address in a confidential manner.

18. A non-transitory computer-readable storage medium having stored thereon, a set of computer-executable instructions for causing a computer comprising one or more processors to perform steps comprising:

scanning a multi-dimensional encrypted code using an image sensor, wherein the multi-dimensional encrypted code comprises a combination of colors, geometric shapes, and varied spatial arrangements;

determining a differentiation between subtle color variations and intricate shape arrangements within the multi-dimensional encrypted code using one or more image processing techniques;

identifying at least one color patterns, shape variations, size variations, and spatial distributions within the multi-dimensional encrypted code based on the differentiation between subtle color variations and intricate shape arrangements within the multi-dimensional encrypted code, wherein each of the at least one color patterns are indicative of one at least one encoded characters;

translating the identified at least one color patterns, shape variations, size variations, and spatial distributions into at least one user readable information and a Uniform Resource Locator (URL);

providing at least one of the user readable information to a user;

directing the user to a web address defined by the Uniform Resource Locator (URL), wherein the multi-dimensional encrypted code comprises time-based color changes to encode dynamic information, allowing the code to represent different data at different time intervals; and employing a neural network trained using machine learning techniques, the neural network being dynamically updated in real time based on newly encountered color patterns and geometrical shapes during scanning, wherein the neural network is configured to continuously improve identification of variations in geometrical shapes and plurality of colors to enhance accuracy, efficiency, data storage and retrieval mechanisms.

* * * * *